Figure 1:
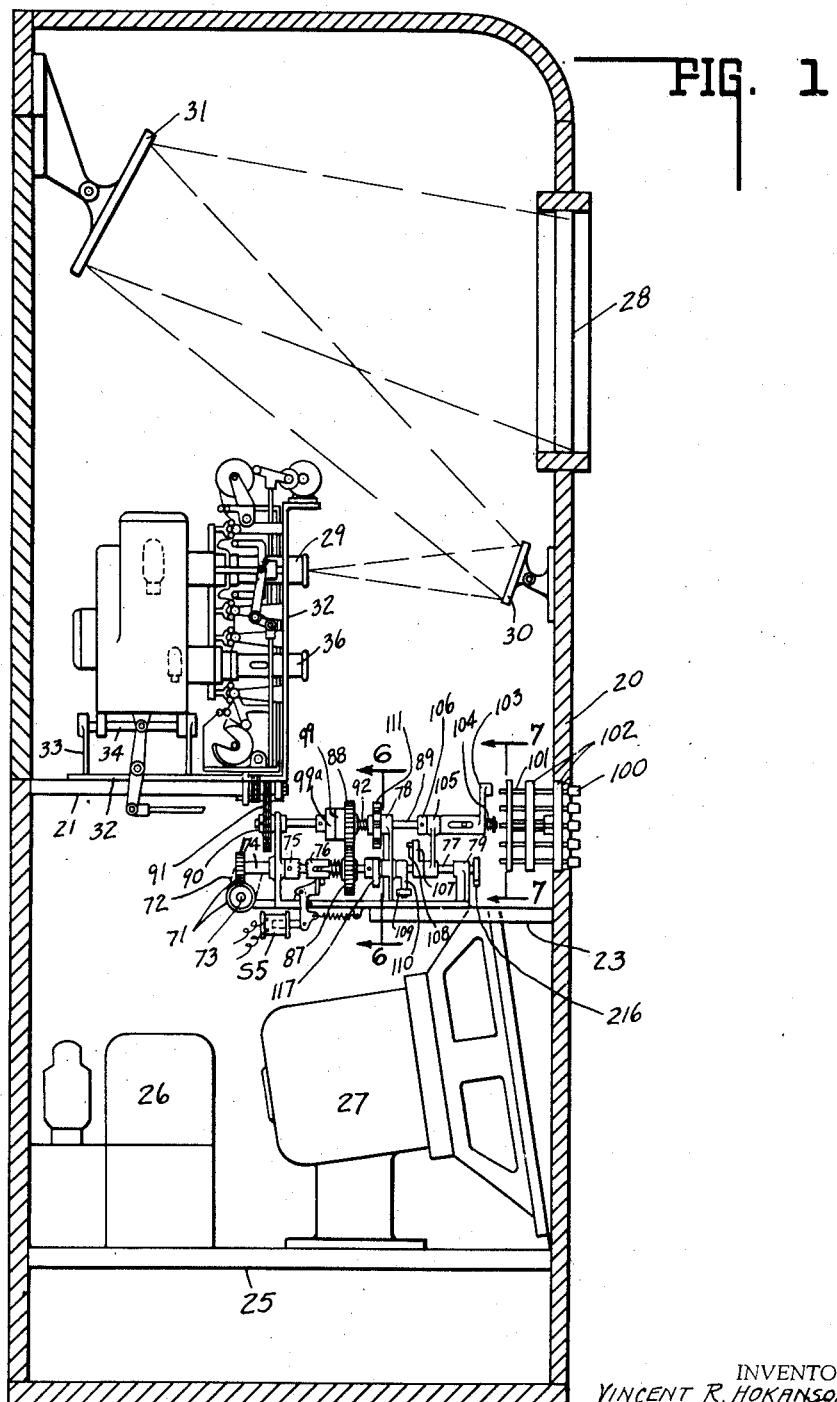

Dec. 31, 1940. V. R. HOKANSON 2,227,259
AUTOMATIC PROJECTOR MACHINE
Filed April 18, 1938 5 Sheets-Sheet 1

INVENTOR.
VINCENT R. HOKANSON.
BY Lockwood Goldsmith & Galt
ATTORNEYS.

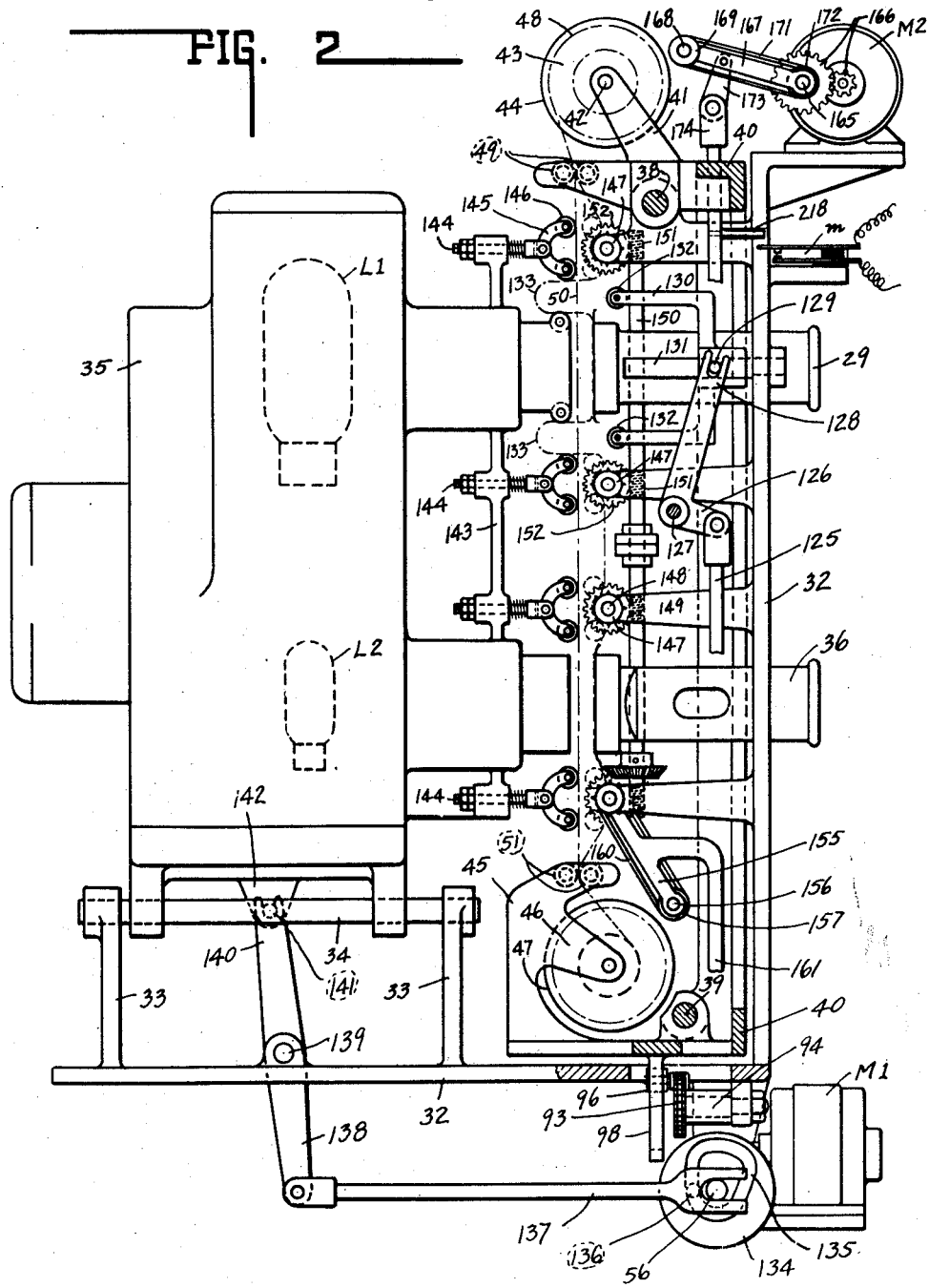

Dec. 31, 1940.  V. R. HOKANSON  2,227,259
AUTOMATIC PROJECTOR MACHINE
Filed April 18, 1938  5 Sheets-Sheet 3
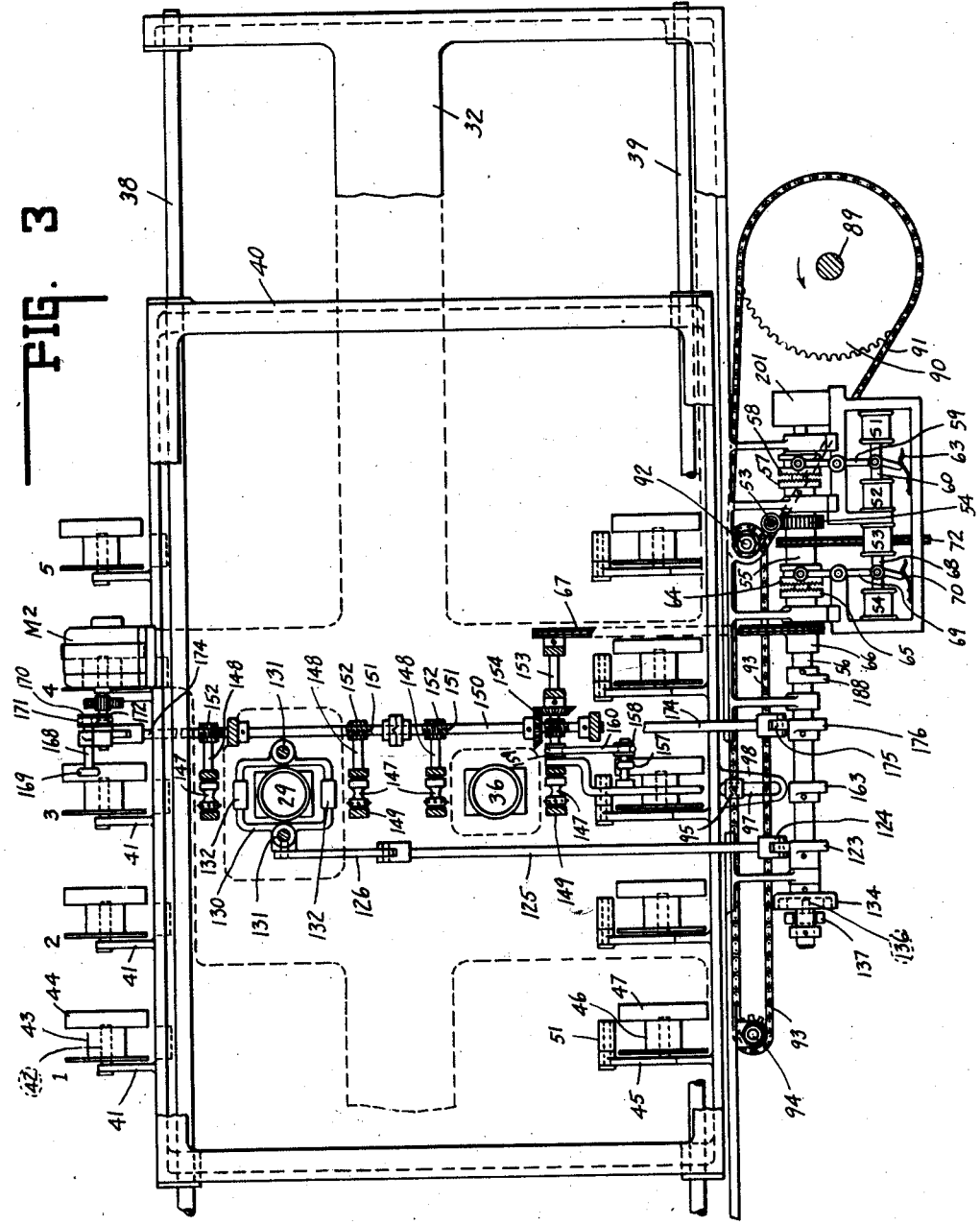
INVENTOR.
VINCENT R. HOKANSON,
BY Lockwood Goldsmith & Galt
ATTORNEYS.

Dec. 31, 1940.   V. R. HOKANSON   2,227,259
AUTOMATIC PROJECTOR MACHINE
Filed April 18, 1938   5 Sheets-Sheet 4
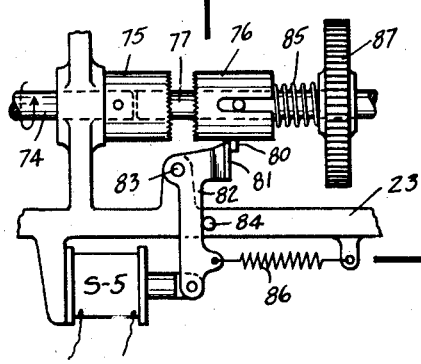
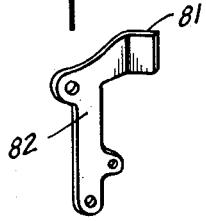
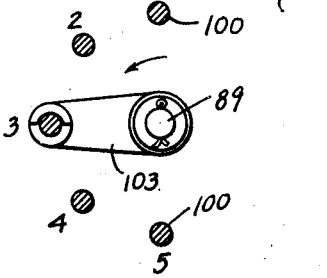
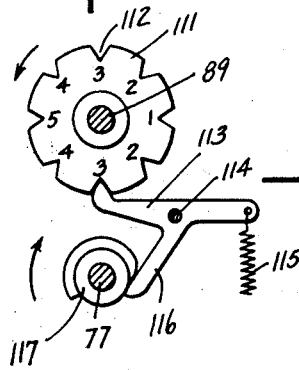
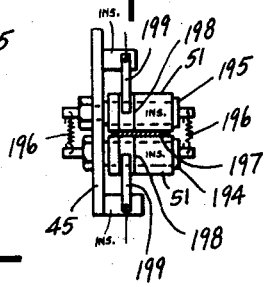
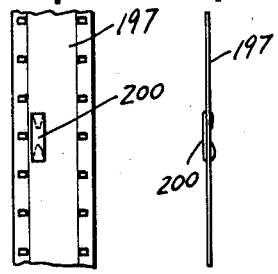
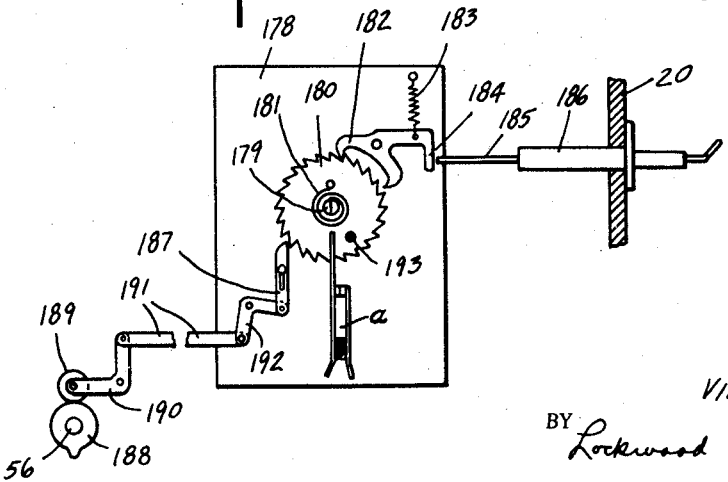
INVENTOR.
VINCENT R. HOKANSON.
BY Lockwood Goldsmith - Galt
ATTORNEYS.

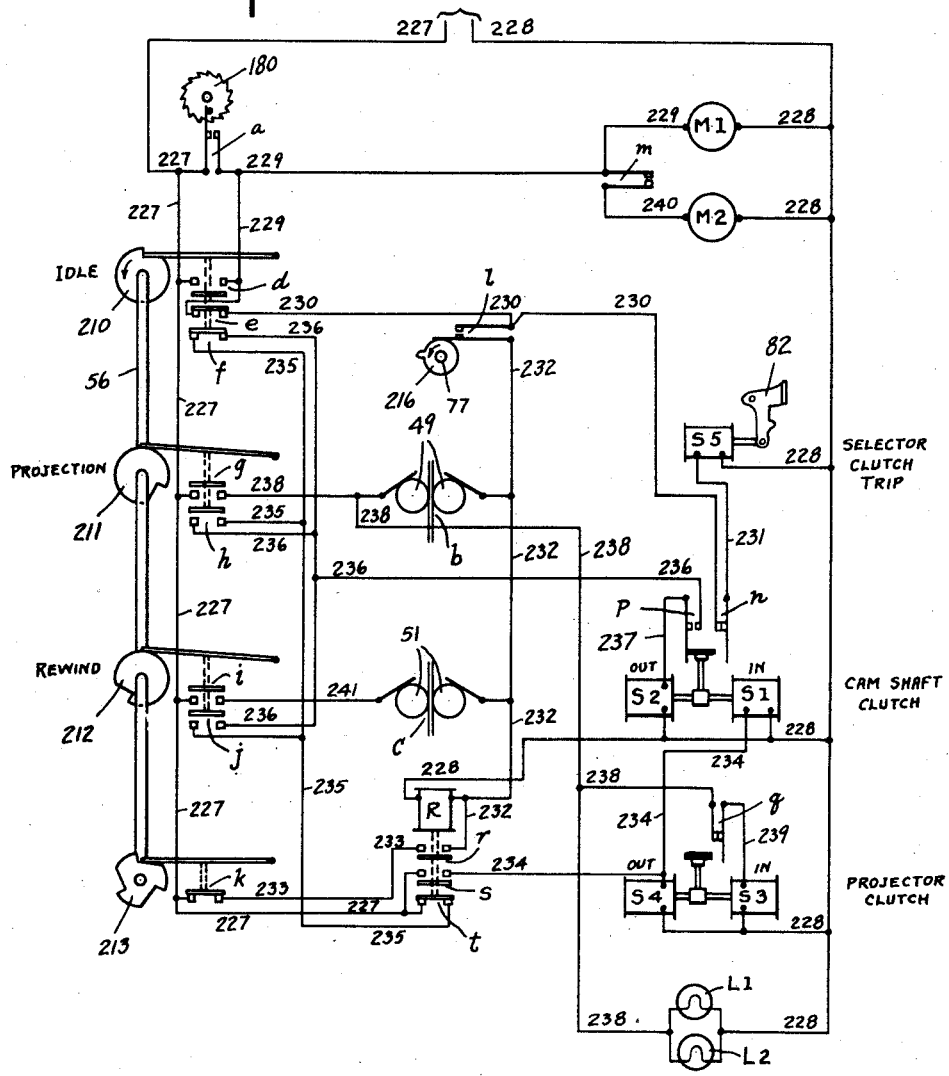

Patented Dec. 31, 1940

2,227,259

UNITED STATES PATENT OFFICE 2,227,259

AUTOMATIC PROJECTOR MACHINE

Vincent R. Hokanson, Benton Harbor, Mich.

Application April 18, 1938, Serial No. 202,671

14 Claims. (Cl. 88—17)

This invention relates to an automatic projector machine adapted for reproducing sound or moving pictures or both from a photographic film.

One object of the invention is to produce a machine in which any one of a plurality of films stored therein may be preselected by an operator and will be automatically threaded into the reproducing mechanism and automatically shown.

Another object of the invention is to produce a machine which may be easily operated by persons not skilled in the use of moving picture apparatus and which is thus adapted for home use or for coin controlled use in places frequented by the general public.

To this end the invention provides storage means in which may be placed a plurality of films, together with means for automatically moving a selected film into cooperative relation with a reproducing mechanism, reproducing the same, and returning it to the storage means in its original condition.

While the invention is particularly adapted for sound picture films, it is applicable as well to silent picture films and to films carrying a sound track only.

Other objects and features of the invention will be understood from the accompanying drawings and the following description and claims:

Fig. 1 is a sectional view in elevation of a cabinet having the invention in one of its preferred forms installed therein and showing particularly the mechanism used for preselecting a film to be shown. In this figure certain parts are removed to show others in detail. Fig. 2 is an enlarged view in elevation and partly in section of the projecting mechanism and film storage means. Fig. 3 is a front elevational view of the same. Fig. 4 is a detailed view in elevation of a clutch mechanism which may be used for starting the operation of selecting a film. Fig. 5 is a perspective view of one of the elements shown in Fig. 4. Fig. 6 is a sectional view on the line 6—6 of Fig. 1. Fig. 7 is a sectional view on the line 7—7 of Fig. 1. Fig. 8 is a perspective view of one end of a member used in the film selecting mechanism. Fig. 9 is a plan view of electrical mechanism used for initiation of certain operations. Fig. 10 is a front view and Fig. 11 is a side view of a film having an attachment thereon for cooperation with the apparatus of Fig. 9. Fig. 12 is an elevational view of a form of coin control switch which may be used with the invention when coin control is desired. Fig. 13 is a diagram of wiring connections.

In the preferred form of the invention disclosed in the drawings, by way of illustration, there is provided a cabinet 20 having a shelf 21 carrying the projecting mechanism and a second shelf 23 supporting mechanism used in controlling the selection of a film. Beneath the shelves 21 and 23 a third shelf 25 supports amplification apparatus 26 and a speaker 27 which may be of any well known form for the translation of electrical impulses into sound. In the front wall of the cabinet there is placed a transparent screen 28 which receives the images from the optical system 29 of the projector by reflection from a pair of mirrors 30 and 31. The image thus received on the screen is visible to an observer.

Projector

The projecting mechanism is provided with a stationary frame 32 securely mounted upon the shelf 21 and having a pair of brackets 33 between which there extends a pair of parallel guide rods 34, only one of which appears in the drawings. A projector housing 35 is slidably mounted on said guide rods and contains the usual projector lamp L1 and exciter lamp L2. The optical system 29 and photocell housing 36 are mounted on the frame 32. The lamp L1 cooperates with the optical system in the usual manner to produce visual images from the film. The lamp L2 cooperates with the photographic sound track of the film and with a photocell in the housing 36 in the usual manner to produce variable electric currents which may be translated into sound by the amplifier 26 and speaker 27.

Film storage means

The frame 32 also carries a pair of horizontal guide rods 38 and 39 on which there is slidably mounted a magazine frame or carriage 40. The carriage 40 is provided with a plurality of brackets 41 at the top thereof, each of which carries a pin 42 which may support a film reel 43 having a friction flange 44 on its edge. The carriage 40 is also provided with lower brackets 45 on which there are similarly mounted film reels 46 having friction flanges 47. The reels 43 and 46 may be frictionally restrained against undesired rotation by means well known in the moving picture art. Each of the reels 46 is immediately beneath one of the reels 43 and each of the upper reels normally contains a full roll of film 48, the leading end of which is trained between a pair of rollers 49 carried by the frame 40 and from there straight downwardly as indicated by the broken line 50 in Fig. 3 to a pair of rollers 51 carried upon the bracket 45. The lower end of each film is attached to the corresponding lower reel 46. As many reels of film may be provided as desired. In the present case, five such reels are shown by way of illustration.

Driving mechanism

Power for moving the various parts of the mechanism is preferably supplied by an electric motor M1 which is mounted on a suitable bracket provided on the frame 32 and which drives a worm 53, best seen in Fig. 3. The worm 53 meshes with a worm gear 54 which is mounted upon a sleeve 55. Said sleeve is rotatably mounted upon a cam shaft 56 and has secured thereto a clutch member 57 adapted to mate with a sliding clutch member 58 splined to the cam shaft 56. The sliding clutch member 58 is moved into and out of engagement with its mating member 57 by a lever 59 attached to a solenoid plunger 60 which may be moved in one direction to engage the clutch by a solenoid S1 and in the opposite direction to disengage the same by a solenoid S2. The plunger 60 is yieldingly retained in either position by a humped leaf spring 63 so that the momentary actuation of either solenoid may place the plunger in the corresponding position and it will remain in that position even though the solenoid is deenergized.

The cam shaft 56 carries a series of cams which control the operation of various parts of the mechanism. The operation of the cam shaft is started and stopped by the operation of the cam shaft clutch 57—58 just described.

The motor M1 also operates the projector mechanism. This is accomplished through a sliding clutch member 64 splined to the continuously rotating sleeve 55 and adapted to engage a clutch member 65 secured to a sleeve 66 freely mounted upon the cam shaft 56. The sleeve 66 carries a sprocket in turn carrying a sprocket chain 67 adapted to drive the projector mechanism to be described hereinafter. The projector clutch 64—65 is operated by solenoids S3 and S4 through a plunger 68 and lever 69 in the same manner as the cam shaft clutch 57—58 and is retained in either position by a leaf spring 70.

The motor M1 also supplies power for moving the carriage 40 to bring a selected film into proper position with relation to the projector mechanism. This is accomplished through a chain 72 trained about sprockets secured to the continuously rotated sleeve 55 and to a parallel shaft 73 (Fig. 1). The shaft 73 drives a shaft 74 through a pair of skew gears 71. The shaft 74 terminates within a clutch member 75 which is secured to said shaft (Fig. 4) and which mates with a sliding clutch member 76 splined to a shaft 77 which is journaled in the clutch member 75 and in brackets 78 and 79 supported by the shelf 23.

The clutch member 76 carries a pin 80 adapted to engage the inclined surface 81 of a cam lever 82 (Fig. 5) in the rotation of said clutch member. The cam lever 82 is pivotally mounted at 83 and engages a stop pin 84. When the clutch members 75—76 are engaged and both shafts 74 and 77 are rotating, the pin 80 strikes lever 82 and tends to press said lever against the pin 84. In so doing the pin 80 rides upon the surface 81 and withdraws clutch member 76 from member 75 against the action of a spring 85, thus bringing the shaft 77 to rest in the position shown in Fig. 4.

With the parts in this position, the momentary actuation of a solenoid S5, whose plunger is pivotally attached to the lower end of cam lever 72, rocks said lever against the actions of the spring 85 and a second spring 86 until the surface 81 slips past the pin 80, whereupon spring 85 presses the clutch members together to start the rotation of shaft 77. At the end of a complete revolution of said shaft, the pin 80 again engages lever 82 to stop said rotation. A single rotation of shaft 77 thus results from each momentary actuation of the solenoid S5 and this single rotation controls the operation of the selection mechanism now to be described.

Film selection mechanism

The shaft 77 has fixed thereto a gear 87 meshing with a gear 88 freely carried by a parallel shaft 89. The gear 88 has a friction connection 99 with a collar 99a secured to shaft 89 and is pressed against said friction connection by a spring 92. The rotation of shaft 77 therefore rotates shaft 89 through the friction connection unless shaft 89 is mechanically held against rotation by other means. In that case, said friction connection may slip, permitting rotation of shaft 77 without movement of shaft 89.

The shaft 89 carries a sprocket 90 (Fig. 3) having a chain 91 connecting the same to a suitable sprocket mounted on a stub shaft 92 carried by the stationary frame 32. A second chain 93 is trained about a second sprocket on said stub shaft and about a sprocket carried by a second stub shaft 94 also mounted on the frame 32. The sprockets on shaft 92 are secured together so movement of chain 91 moves chain 93.

Chain 93 carries an attachment 95 on which there is mounted a roller 96 (Fig. 2) slidable in a slotted opening 97 in an arm 98 extending from the film storage carriage 40. By this means, the rotation of shaft 89 slides carriage 40 backward and forward on the guide rods 38 to bring the films successively into the proper position with relation to the optical system 29 and the photocell housing 36 of the projection mechanism. The ratios of the several sprockets are such that one complete revolution of shaft 89 corresponds to one complete round trip of the carriage 40. There is therefore a definite position of the shaft 89 at which each of the films is in register with the projector mechanism.

For preselecting the position at which the shaft 89 will be stopped, there are provided a plurality of push buttons 100 (Fig. 1) equal in number to the films carried by the storage means. Said buttons are mounted on the cabinet in a position accessible to the operator. Each push button is connected to a stem 101 slidable in a suitable frame 102. When one of the push buttons is pressed, the corresponding stem 101 is moved into the path of travel of a selector arm 103 which is splined to the shaft 89 and is retained by a spring 104 against a member 105 freely mounted on both shafts 77 and 89. Said member abuts against a collar 106 on shaft 89 and is provided with an arm 107 having a projection 108 adapted to be engaged by a roller 109 carried by an arm 110 secured to the shaft 77.

An indexing wheel 111 (Fig. 6) is fixed on shaft 89 and is provided with a plurality of notches 112 about its periphery engageable by the pointed end of a locking lever 113 pivotally mounted on the bracket 78 and retained in engagement with the wheel 111 by a tension spring 115. The lever 113 has an arm 116 engaging a cam 117 on the shaft 77 by means of which said locking lever may be withdrawn from the wheel 111 for a predetermined period in each rotation of shaft 77. Each of the notches 112 in the indexing wheel corresponds to a position of the carriage 40 at which one of the films is in registry with the projecting mechanism. As long therefore as the locking lever 113 engages one of said notches the carriage 40 is locked against movement and one of said films is in position to be shown. In the present instance five reels of film are assumed to be stored in the machine and are indicated by numbers 1 to 5 in Fig. 3. Reels numbers 1 and 5 are in position to be shown when the carriage 40 is at the extreme right or left end of its travel. Each of the other films may be in position during the movement of the carriage 40 either to right or left. For that reason there are provided on the wheel 111 two notches for each of films 2, 3 and 4 and one notch each for films 1 and 5 as indicated by number in Fig. 6.

Operating cycle—selection mechanism

In the operation of the film selecting mechanism, any one of the push buttons 100 is pressed to preselect the corresponding film. The solenoid S5 is then actuated by a suitable electric circuit to trip the selector clutch 75—76 and start rotation of shaft 77, whereupon cam 117 operates to release locking lever 113 to permit shaft 89 to be rotated by the friction connection 99. The rotation of shaft 89 moves the storage carriage 40 until arm 103 strikes the stem 101 of the selected push button and is stopped thereby with the selected film in position to be shown. Continued rotation of shaft 77 causes cam 117 to permit lever 113 to engage the notch corresponding to the newly selected film and to lock the selecting mechanism in place. Continued rotation of the shaft 77 thereafter brings roller 109 into engagement with projection 108 and presses the member 105 and arm 103 to the right in Fig. 1. The outer end of arm 103 is shaped as best shown in Fig. 8 and when moved to the right presses the selected stem 101 and push button 100 back into its origin position. When roller 109 has passed projection 108, spring 104 returns arm 103 and member 105 to their initial positions. Immediately thereafter, the single rotation of shaft 77 is completed and the selector clutch 75—76 is thrown out by engagement of pin 80 with cam lever 82.

The ratio of gears 87 and 88 and the shape of cam 117 are such that shaft 89 makes slightly more than one revolution during the time that lever 113 is free from wheel 111. Arm 103, therefore, may pass all of the stems 101 and will be stopped by the first one which is in the selected position. If none of the push buttons have been pressed, the lever 113 engages the wheel 111 at a point just beyond the notch from which it was withdrawn. In that case rotation of shaft 89 continues until said lever engages the next of the notches 112. In this manner, when no selections are made, the films are automatically shown in the sequence indicated by the numerals in Fig. 6.

When more than one of the selector buttons 100 have been pressed, the mechanism operates to select for first reproduction the film corresponding to the first of the selected stems 101 to be reached by the arm 103. For its second operation, the arm 103 moves to the next of said stems and so on. Thus, any number of films may be preselected at one time and will be reproduced in the order in which the arm 103 reaches the corresponding stems 101.

Film threading mechanism and operation thereof

During the movement of the magazine carriage 40, the several films extend vertically between the rollers 49 and 51 as indicated at 50 in Fig. 2. The projector housing 35 occupies the position shown in that figure, in which there is a clear vertical raceway between the parts carried by said housing and the optical system 29 and photocell casing 36 carried by the frame 32. The several films may thus pass through this raceway in the movement of the carriage 40. When the proper film has been placed in position, the rotation of cam shaft 56 is started by actuation of solenoid S1.

The first rotation of cam shaft 56 causes a cam 123 to operate upon a follower 124 carried on the lower end of a pitman 125 to elevate said pitman. The pitman 125 is suitably guided in brackets formed on the frame 32 and not shown. Said pitman is pivoted at its upper end to a bell crank lever 126 which is pivotally mounted at 127 on a bracket secured to the frame 32 and not shown in the drawings. The bell crank 126 has a forked upper end 128 engaging a pin 129 formed on a frame 130 which is slidably mounted upon pins 131 carried by the frame 32. The frame 130 carries a pair of rollers 132. The elevation of the pitman 125 by the cam 123 moves the frame 130 to the left in Fig. 2 and brings the rollers 132 into engagement with the film and in so doing draws sufficient film from the reel 43 to form loops indicated by the broken lines 133 in Fig. 2.

Simultaneously with the formation of the loops the projector casing 35 is moved to the right in Fig. 2 by means of a cam 134 carried by the cam shaft 56. Said cam has a guideway 135 in which a follower 136 is adapted to travel. Said follower is in the form of a roller mounted on the side of a forked pitman 137, the forks of which embrace the shaft 56 and which is pivotally connected to the lower end of the lever 138. The lever 138 is pivoted on the frame 32 at 139 and has a forked upper end 140 engaging a pin 141 on a bracket 142 formed on the lower face of the projector housing 35. The guideway 135 is properly shaped to move the housing 35 to the right and left at the proper point in the rotation of the cam shaft 56.

The projector housing 35 carries a member 143 in which there is mounted a plurality of spring pressed rods 144, each horizontally slidable and each carrying at its outer end a fork 145 having a pair of rollers 146 mounted thereon. In the movement of the projector housing 35 to the right in Fig. 2 the rollers 146 engage the film and press the same against drive sprockets 147 which have the usual projections engaging the perforations on the edges of the film. When the movement of casing 35 is complete, cam 123 permits the frame 130 to be withdrawn, leaving the loops 133 free in the usual manner. With the apparatus in this condition, the film is in the proper position for reproduction of moving pictures by means of the projector lamp L1 and optical system 29 and for the generation of electrical impulses which may be translated into sound by the exciter lamp L2 and the photoelectric cell contained in the housing 36.

Projection mechanism

The drive sprockets 147 are mounted on shafts 148 (Figs. 2 and 3) carried on arms 149 formed on the stationary frame 32. Said shafts are rotated by a vertical shaft 150 by means of worms 151 and worm gears 152. The shaft 150 is driven by a shaft 153 through a pair of bevel gears 154. Shaft 153 carries a sprocket driven by the chain 67 when the projector clutch 64—65 is in engagement. The usual mechanism for causing the intermittent movement of the film past the optical system is also provided but is not shown in the drawings. It is preferably driven by the shaft 150 by any well known means.

The lowermost of the shafts 148 has an arm 155 journaled thereon which carries at its lower end a shaft 156 having mounted thereon a friction wheel 157 and a pulley 158. The friction wheel and pulley are rotated by a pulley 159 on the shaft 148 through a belt 160. An arm 161 is formed integrally with the arm 155 and extends downwardly into engagement with a cam 163 on the cam shaft 56. Said cam is shaped to move the arm to left or right in Fig. 2 to move the friction wheel 157 into and out of engagement with the reel 46.

Operation of projection mechanism

In the position of the mechanism shown in Fig. 2 the friction wheel 157 is lifted above the path of travel of the film reels 46. When the proper reel has been brought to position and the cam shaft 56 has been started, the cam 163 permits the arm 161 to move to the left, thus lowering the friction wheel 157 into engagement with the friction flange 47 of the reel 46 of the selected film. This may occur simultaneously with the movement of the projector housing previously described and when both movements have been completed the cam shaft 56 has completed approximately one-third of a revolution and is brought to rest by a momentary actuation of the solenoid S2 in what may be termed its "projection" position.

Simultaneously with the stopping of the cam shaft 56, solenoid S3 is momentarily actuated to engage the projector clutch 64—65. The drive sprockets 147 are now rotated to draw the film from the selected reel 43 while the corresponding reel 46 is rotated by the friction wheel 157 to wind the film thereon. The film is thus passed through the projecting mechanism in the usual manner and the pictures and sound recorded thereon are reproduced.

Rewind mechanism

For rewinding the film after showing, there is provided a motor M2 mounted on the frame 32 and driving a shaft 165 through reduction gears 166. Said shaft has pivoted thereon an arm 167 carrying at its outer end a shaft 168 having a friction wheel 169 and pulley 170 mounted thereon. Said pulley is connected by a belt 171 to a pulley 172 carried on the shaft 165. The arm 167 is connected by a link 173 to the upper end of a pitman 174 suitably guided in the frame 32 and having at its lower end a follower 175 engaging a cam 176 on the cam shaft 56.

Rewinding operation

When the showing of the selected film has been completed, solenoid S4 is momentarily actuated to throw out the projector clutch 64—65 to stop the projection mechanism. At the same time solenoid S1 is again actuated to start the rotation of the cam shaft 56 through its second one-third revolution. During this movement of the cam shaft, the projector housing 35 is withdrawn to its Fig. 2 position by the cam 134 to free the film, the friction wheel 157 is lifted from the reel 46 by cam 163 and the friction wheel 169 is lowered into engagement with the friction flange of the reel 43 by cam 176. The motor M2 is started to rotate the reel 43 to rewind the film and at substantially the same time the solenoid S2 is actuated to stop the cam shaft at the end of its second one-third revolution in what may be termed the "rewind" position.

When the film has been completely rewound, the solenoid S1 is again actuated to start the rotation of the cam shaft 56 through its final one-third revolution, during which the pitman 174 is raised by the cam 176 to remove the friction wheel 169 from the reel 43 and the motor M2 is stopped. At the end of the complete revolution of the cam shaft 56 it is stopped in its initial or idle position. All parts are now in position for the initiation of another cycle of operations.

Electrical apparatus for automatic control

One form of electrical apparatus and wiring by which the automatic operation of the machine may be controlled is illustrated in Fig. 13. The individual parts thereof will first be described in detail.

In Fig. 12 there is shown a magazine switch which may be used when the machine is to be coin controlled. Said switch includes a pair of resilient contact leaves $a$ mounted on a plate 178 and suitably insulated therefrom. A pin 179 mounted on said plate rotatably supports a ratchet wheel 180 which is normally urged in the counterclockwise direction by a torsion spring 181 having one end anchored to said ratchet wheel and the other end anchored to said pin. The ratchet wheel is normally restrained by an escapement lever 182 pivoted to the plate 178 and held in engagement with the wheel 180 by a tension spring 183. Said escapement lever has a downwardly extending arm 184 positioned to be struck by a slide 185 of a well known form of coin receiving device 186 each time a coin is placed therein and the slide is pressed home. Each such operation actuates the escapement to permit the ratchet wheel to move counterclockwise through an angular distance represented by one tooth of the ratchet.

For moving the ratchet wheel in the opposite direction against the action of spring 181 there is provided a slidably mounted dog 187, the point of which may engage the ratchet teeth and which is operated at any convenient point in the rotation of cam shaft 56 by a cam 188 on said shaft operating through a follower 189, bell crank lever 190, link 191 and bell crank lever 192. Each such operation rotates the ratchet wheel an angular distance in the clockwise direction corresponding to one tooth of the ratchet wheel. The ratchet wheel 180 carries an insulated pin 193 adapted to engage one of the contact leaves $a$ to open the switch when said ratchet wheel reaches the limit of its clockwise movement.

In the operation of the switch the receipt of one or more coins causes counterclockwise rotation of the ratchet wheel through an angular distance proportional to the number of coins received. The switch $a$ is closed by this movement and remains closed until the machine has been operated a corresponding number of times.

Each pair of the guide rollers 49 and 51 (Fig. 2) forms an element in the electrical control system. A description of one pair as illustrated 51 is mounted on a fixed pin 194 and the second is mounted on a floating pin 195 resiliently constrained toward the first by tension springs 196 to hold the film 197 between the rollers. Each of the rollers is formed of insulation material with a narrow ring 198 of conducting material inset in the surface thereof. Each of said rings is engaged by a contact brush 199 supported on the bracket 45 and insulated therefrom. Near each end of each of the films 197 there is provided a contact piece 200 illustrated in Figs. 10 and 11. Said contact pieces in passing between the rollers make a momentary electrical connection between the corresponding rings 198. In the rollers 51 the rings 198 are offset to one side of the roller and the contact piece 200 at the starting end of the film is similarly offset. In the rollers 49 the rings are offset in the opposite direction as is also the contact piece 200 at the finish end of the film. Thus, contact will be made at the rollers 51 only at the starting end of the film and at rollers 49 only at the finish end.

Each pair of rollers in effect constitutes an electric switch, those associated with rollers 49 being referred to in the wiring diagram, Fig. 13, and the description of the wiring as switches *b* and those associated with rollers 51 as switches *c*. Obviously, there is one switch *b* and one switch *c* for each of the reels in storage. However, in the diagram only one of each is shown, it being understood that all of the switches *b* are connected in parallel and all of the switches *c* are similarly connected.

A switch box 201 (Fig. 3) is associated with the cam shaft 56 and contains a plurality of cam operated switches *d* to *k*, inclusive, shown in Fig. 13 and operated by cams 210 to 213, inclusive, in a predetermined sequence to be described.

A switch *l* is operated by a cam 216 mounted on the shaft 77.

A switch *m* (Figs. 2 and 13) is closed by an insulated pin 218 on the pitman 174 when said pitman is lowered for the rewinding operation and is opened when said pitman is raised at the end of said operation.

A switch *n* is opened each time the solenoid S1 is energized and closed each time solenoid S2 is energized.

A switch *p* is opened each time solenoid S2 is energized and closed each time solenoid S1 is energized.

A switch *q* is opened each time solenoid S3 is energized and closed each time solenoid S4 is energized.

An electromagnetic relay R, when energized, closes switches *r* and *s* and opens a switch *t*.

Power for the electrical operation is supplied from a pair of power mains 227 and 228 which may be connected to any suitable source of current and may be provided with the usual overload protection not shown.

*Operation of electrical control apparatus*

The wiring connections can best be described in connection with a cycle of operation of the machine. In this description conductors are referred to by reference number only in tracing the circuits of which they form a part. Conductors having more than one branch carry the same reference number throughout the several branches.

In Fig. 13 the various electrical units are shown in the positions they assume when the machine is idle. The cam shaft 56 is in its idle position in which cam 210 has opened switch *d* and closed switches *e* and *f*. No circuits are complete.

When a coin is received the magazine switch *a* is closed, completing a circuit to start the motor M1 (227, *a*, 229, M1, 228).

At the same time a circuit for solenoid S5 is completed to trip the selector clutch 75—76 and start the operation of selecting a film (227, *a*, 229, *e*, 230, *n*, 231, S5, 228).

After the movement of carriage 40 is complete but before shaft 77 has completed its single revolution, cam 216 momentarily closes switch *l* and completes a circuit for the relay R (227, *a*, 229, *e*, 230, *l*, 232, R, 228). Relay R opens switch *t* with no immediate effect and closes switches *r* and *s*.

The closing of switch *r* completes a holding circuit for relay R to hold it in the energized condition after switch *l* is opened (227, *k*, 233, *r*, 232, R, 228).

The closing of switch *s* completes a circuit for solenoids S1 and S4 (227, *s*, 234, S4 and S1, 228). The projector clutch is already disconnected so the energizing of solenoid S4 has no effect. The energizing of solenoid S1 starts the rotation of cam shaft 56 and also opens switch *n* to deenergize solenoid S5. This occurs before the rotation of shaft 77 is complete so that cam lever 82 will be in position to stop the rotation of said shaft when its single revolution is complete.

The first movement of cam shaft 56 opens switches *e* and *f* and closes switch *d*. Switch *d* is in parallel with the magazine switch *a*. The latter may, therefore, be opened by its cam 188 (Fig. 12) at any time thereafter without stopping the operation of motor M1 until switch *d* is opened at the end of a complete revolution of cam shaft 56.

The opening of switch *e* prevents solenoid S5 from again being energized until the cam shaft 56 has returned to its idle position.

The opening of switch *f* prevents a circuit for solenoid S2 being completed when relay R is deenergized. As soon as switch *f* is opened, cam 213 opens switch *k* to break the relay holding circuit, permitting switches *r* and *s* to open and switch *t* to close. Solenoids S1 and S4 are thus deenergized but no circuit is completed through switch *t*.

The rotation of cam shaft 56 continues through the first one-third revolution during which the projector casing 35 is moved into projecting position and the friction wheel 157 is placed against the reel 46 and at the end of which cam 213 closes switch *k* with no immediate result and cam 211 closes switches *g* and *h*.

The closing of switch *h* completes a circuit for solenoid S2 to stop the rotation of the cam shaft 56 (227, *t*, 235, *h*, 236, *p*, 237, S2, 228). This circuit is immediately broken by the opening of switch *p*.

The closing of switch *g* completes a circuit to light the projector lamp L1 and exciter lamp L2 (227, *g*, 238, L1 and L2, 228). This circuit remains complete as long as the cam shaft remains in this position.

The closing of switch *g* also completes a circuit for solenoid S3 to engage the projector clutch 64—65 for starting the projection mechanism (227, *g*, 238, *q*, 239, S3, 228). This circuit is immediately broken by the opening of switch *q*.

At the end of the projection period the contact piece 200 near the finish point of the film passes between the rollers 49 and momentarily closes switch *b* to complete a circuit for the relay R (227, *g*, 238, *b*, 232, R, 228). Switch *r* then sets up the relay holding circuit as before and switch *s* again completes the circuit for solenoids S1 and S4 to start the cam shaft 56 and to throw out the projector clutch 64—65 and stop the projector mechanism.

Solenoid S4 also permits switch *q* to close and remake the circuit for solenoid S3. Since solenoid S4 remains energized, however, the energizing of solenoid S3 has no effect.

The first movement of cam shaft 56 from its projection position opens switches *g* and *h*. The opening of switch *g* extinguishes the lamps L1 and L2 and deenergizes solenoid S3. The opening of switch *h* prevents the immediate establishment of a circuit to solenoid S2 when relay R is deenergized. Immediately after switches *g* and *h* are opened, cam 213 opens switch *k* to break the relay holding circuit and deenergize solenoids S1 and S4.

The rotation of cam shaft 56 continues through its second one-third revolution during which the friction wheel 157 is lifted from the reel 46 and the friction wheel 169 is lowered to the reel 43. The movement of pitman 174 closes switch *m* and completes a circuit to start the rewind motor M2 (227, *d*, 229, *m*, 240, M2, 228).

At about the same time that the rewind motor is started, the cam shaft 56 completes its second one-third revolution, cam 213 closes switch *k* with no immediate result and cam 212 closes switches *i* and *j*.

The closing of switch *i* has no immediate result.

The closing of switch *j* completes a circuit for solenoid S2 to stop the cam shaft in its rewind position (227, *t*, 235, *j*, 236, *p*, 237, S2, 228). This circuit is immediately broken by the opening of switch *p*.

Near the end of the rewinding of the film the contact piece 200 at the starting end of the film passes between the rollers 51 and momentarily closes switch *c* to complete a circuit for the relay R (227, *i*, 241, *c*, 232, R, 228). The relay switches operate as before to set up the relay holding circuit and to energize solenoid S1 to start the cam shaft.

The first movement of the cam shaft from its rewind position opens switches *i* and *j* immediately after which cam 213 opens switch *k* to break the relay holding circuit as before. The pitman 174 is raised at the same time, removing friction wheel 169 from the reel 43 and opening switch *m* to stop the rewind motor R2.

At the end of the final one-third revolution of cam shaft 56, cam 210 closes switches *e* and *f* and opens switch *d*. The closing of switch *f* completes a circuit for solenoid S2 to stop the cam shaft in its initial or idle position (227, *t*, 235, *f*, 236, *p*, 237, S2, 228). This circuit is immediately broken by the opening of switch *p*.

If sufficient coins have not been deposited at this time to continue the operation of the machine, the magazine switch *a* is standing open and the opening of switch *d* then breaks the circuit to motor M1 and stops the operation of the machine. The closing of switch *e* then has no result. If magazine switch *a* is closed, however, then the opening of switch *d* has no result and the closing of switch *e* energizes solenoid S5 to initiate another cycle of operations.

When coin control is not desired, it is obvious that the magazine switch *a* may be replaced by a manually operated snap switch. The machine will continue to operate, showing films successively or by selection as long as the switch is closed.

The foregoing specification describes the invention in one of its preferred forms. The details thereof may be varied within wide limits without departing from the scope thereof as defined by the appended claims. Thus, by omission of the projector lamp and optical system, the invention may be used to reproduce only the sound recorded upon the sound track of the film and then operates simply as an automatic phonograph. By omission of the exciter lamp and photocell mechanism, the invention is applicable to silent films. The reference in the claims to the reproduction of "sensible impressions" is intended to include either the reproduction of pictures or sound, or both. Similarly, the word "projector," unless otherwise qualified, includes a device for projecting either pictures or sound, or both, while the word "record" includes either the sound track or the picture images carried by a film, or both. The word "film" is also intended to include the usual leader strips at each end thereof irrespective of the material of which they may be formed.

The invention claimed is:

1. The combination of a moving picture projector having film moving mechanism and a projector lamp and optical system movable relatively of each other to a film receiving position providing a clear raceway for transverse movement of a film therebetween and to a projecting position in which said raceway is closed, a plurality of individual films carrying images to be projected thereby, a plurality of reels carrying said films, a reel carrying device movable with relation to said projector, and power operated means for selectively positioning said carrying device to present a portion of a desired film in said raceway in a position free of said film moving mechanism and for thereafter moving said projector to the projecting position, said film being engaged with said film moving mechanism in said last mentioned movement.

2. The combination of a projector having film moving mechanism and parts relatively movable with respect to each other to a film receiving position providing a clear raceway for transverse movement of a film therebetween and to a projecting position in which said raceway is closed and said film is arranged for reproduction of a record carried thereby, a plurality of individual films carrying records to be reproduced thereby, a plurality of reels carrying said films, a reel carrying device movable with relation to said projector, and power operated means for selectively positioning said carrying device to present a portion of a desired film in said raceway in a position free of said film moving mechanism and for thereafter moving said projector to the projecting position, said film being engaged with said film moving mechanism in said last mentioned movement.

3. The combination with a projector having mechanism for moving film therethrough for reproducing records on said film, of a movable carriage, a plurality of pairs of film reels carried thereby, each of said pairs of reels having a film normally wound on one of the same and extending to the second for winding thereon during reproduction, power driven means for moving said carriage, and manual means for selecpresent a desired film to said projector with the portion thereof extending between said reels in position to be engaged by said film moving mechanism, but free of said mechanism, and mechanical means for moving said film thereafter to engage said mechanism.

4. The combination with a projector having mechanism for moving film therethrough for reproducing records on said film, of a movable carriage, a plurality of pairs of film reels carried thereby, each of said pairs of reels having a film normally wound on one of the same and extending to the second for winding thereon during reproduction, and power operated means for positioning said carriage to present said films to said projector in a predetermined sequence with the portions thereof extending between said reels in position to be engaged by said film moving mechanism, but free of said mechanism, and mechanical means for moving said film thereafter to engage said mechanism.

5. The combination with a projector having mechanism for moving film therethrough for reproducing records on said film, of a movable carriage, a plurality of pairs of film reels carried thereby, each of said pairs of reels having a film normally wound on one of the same and extending to the second for winding thereon during reproduction, and power means operating said projector, carriage and film reels through a cycle including: first, the movement of said carriage to present a portion of one of said films in position to be engaged by said film moving mechanism; second, the movement of a portion of said projector to so engage said film; third, the operation of said projector to reproduce the record on said film and the simultaneous rotation of the second reel of said film for winding the film thereon; fourth, the movement of said projector part to free the film from said film moving mechanism; and fifth, the rotation of the first reel of said film for rewinding the same thereon.

6. The combination of a projector having separable parts, means for separating said parts to provide a clear raceway for transverse movement of films therebetween, a movable carriage for a plurality of individual films, said films being arranged to pass transversely through said raceway in the movement of said carriage, means for stopping said carriage with one of said films positioned in said raceway, and means operable thereafter to move said projector parts to close said raceway and engage said film for the reproduction of records carried thereon.

7. The combination of a projector having separable parts, means for separating said parts to provide a clear raceway for transverse movement of films therebetween, a movable carriage, a plurality of pairs of film reels carried thereby, each of said pairs of reels having a film normally wound on one of the same and extending to the second for winding thereon during reproduction, said films being arranged to pass the portions thereof extending between said reels transversely through said raceway in the movement of said carriage, means for stopping said carriage with one of said films positioned in said raceway, and means operable thereafter to move said projector parts to close said raceway and engage said film for the reproduction of records carried thereon.

8. The combination of a projector having separable parts, means for separating said parts to provide a clear raceway for transverse movement of films therebetween, a movable carriage, a plurality of pairs of film reels carried thereby, each of said pairs of reels having a film normally wound on one of the same and extending to the second for winding thereon during reproduction, said films being arranged to pass the portions thereof extending between said reels successively transversely through said raceway in the movement of said carriage, means for stopping said carriage with a preselected film positioned in said raceway, and means operable thereafter to move said projector parts to close said raceway and engage said film for the reproduction of records carried thereon.

9. The combination of a projector having parts relatively movable with respect to each other to a film receiving position providing a clear raceway for a film therebetween and to a projecting position in which said raceway is closed and said film is arranged for reproduction of a record carried thereby, a plurality of individual films carrying records to be reproduced thereby, a device for storage of said films, a manually operated selector mechanism having means for preselecting a plurality of said films less than the whole number, and automatic means for positioning a portion of one of the preselected films in said raceway, moving the projector to projecting position, reproducing the record carried by said film, returning said projector to film receiving position, moving said last mentioned film out of said raceway and repeating the operation with each of said preselected films to the exclusion of those not so selected.

10. The combination of a projector having parts relatively movable with respect to each other to a film receiving position providing a clear raceway for a film therebetween and to a projecting position in which said raceway is closed and said film is arranged for reproduction of a record carried thereby, a plurality of individual films carrying records to be reproduced thereby, a device for storage of said films, and automatic power driven means operating through a predetermined cycle for positioning a portion of one of said films in said raceway, moving the projector to projecting position, reproducing the record carried by said film, returning said projector to film receiving position, moving said film out of said raceway and moving another of said films into said raceway.

11. The combination of a projector having parts relatively movable with respect to each other to a film receiving position providing a clear raceway for a film therebetween and to a projecting position in which said raceway is closed and said film is arranged for reproduction of a record carried thereby, a plurality of individual films carrying records to be reproduced thereby, a device for storage of said films, and automatic power driven means operating through a predetermined cycle for positioning a portion of one of said films in said raceway, moving the projector to projecting position, reproducing the record carried by said film, returning said projector to film receiving position, and then rewinding said film.

12. The combination with a projector having mechanism for moving film therethrough for reproducing records on said film, of a movable carriage, a plurality of pairs of film reels carried thereby, each of said pairs of reels having a film normally wound on one of the same and extending to the second for winding thereon during reproduction, power operated means for positioning said carriage to present said films to said projector in a predetermined sequence with the portions thereof extending between said reels in position to be engaged by said film moving mechanism but free thereof, mechanism automatically operable thereafter to move said film into engagement with said film moving mechanism, means for winding each of said films when so presented from one of said reels to the other for projection, and means for thereafter rewinding the same.

13. The combination of a moving picture projector having film moving mechanism and a projector lamp and optical system movable relatively of each other to a film receiving position providing a clear raceway for transverse movement of a film therebetween and to a projecting position in which said raceway is closed, a plurality of individual films carrying images to be projected thereby, a plurality of reels carrying said films, a reel carrying device movable with relation to said projector, a manually operated selector mechanism adapted for preselection of a plurality of films less than the whole number, means automatically operating through a predetermined cycle to present the selected films to the exclusion of those not selected in said raceway in a position free of said film moving mechanism and for moving said projector to projecting position and projecting said film after each such presentation, said film being engaged with said film moving mechanism in the movement of said projector to projecting position.

14. The combination of a projector having film moving mechanism and parts relatively movable with respect to each other to a film receiving position providing a clear raceway for transverse movement of a film therebetween and to a projecting position in which said raceway is closed and said film is arranged for reproduction of a record carried thereby, a plurality of individual films carrying images to be projected thereby, a plurality of reels carrying said films, a reel carrying device movable with relation to said projector, a manually operated selector mechanism adapted for preselection of a plurality of films less than the whole number, means automatically operating through a predetermined cycle to present the selected films to the exclusion of those not selected in said raceway in a position free of said film moving mechanism and for moving said projector to projecting position and projecting said film after each such presentation, said film being engaged with said film moving mechanism in the movement of said projector to projecting position.

VINCENT R. HOKANSON.